United States Patent [19]

Suzuki

[11] Patent Number: 5,524,144
[45] Date of Patent: Jun. 4, 1996

[54] OPTICAL TRANSMISSION APPARATUS

[75] Inventor: Nobuo Suzuki, Tokyo, Japan

[73] Assignee: Kabushiki Kaisha Toshiba, Kawasaki, Japan

[21] Appl. No.: 460,834

[22] Filed: Jun. 5, 1995

Related U.S. Application Data

[63] Continuation of Ser. No. 118,768, Sep. 10, 1993, abandoned.

[30] Foreign Application Priority Data

Sep. 14, 1992 [JP] Japan .................................. 4-271029

[51] Int. Cl.$^6$ .............................. H04B 15/00; G02B 6/26
[52] U.S. Cl. ........................................... 359/176; 359/179
[58] Field of Search ................................. 359/174, 176, 359/177, 178, 179, 110

[56] References Cited

U.S. PATENT DOCUMENTS

| | | | |
|---|---|---|---|
| 4,077,701 | 3/1978 | Steensma et al. | 350/96.15 |
| 4,945,531 | 7/1990 | Suzuki | 370/3 |
| 4,971,417 | 11/1990 | Krinsky et al. | 359/174 |
| 5,019,787 | 5/1991 | Carlson et al. | 330/4.3 |
| 5,184,243 | 2/1993 | Henni et al. | 359/181 |
| 5,212,706 | 5/1993 | Jain | 372/45 |
| 5,224,183 | 6/1993 | Dugan | 385/24 |
| 5,245,467 | 9/1993 | Grasso et al. | 357/341 |
| 5,315,426 | 5/1994 | Aoki | 359/180 |
| 5,333,089 | 7/1994 | Heidemann | 359/341 |
| 5,343,320 | 8/1994 | Anderson | 359/160 |

OTHER PUBLICATIONS

"Optical Amplifiers and Their Applications,–Development of Compact Er$^3$ Fiber Amplifiers for Practical Applications," OSA Proceedings of the Topical Meeting on Optical Amplifiers, vol. 13, p. 238, Aug. 6–8, 1990, Monterey, CA, USA.

"Optical–pulse equalization of low–dispersion transmission in single–mode fibers in the 1.3–1.7-μm spectral region", Lin et al., Optical Letters, vol. 5, No. 11, pp. 476–478, Nov. 1980.

"Dispersion Compensation by Active Predistorted Signal Synthesis", Koch et al., Journal of Lighwave Technology, vol. LT–3, No. 4. pp. 800–804. Aug. 1985.

*Primary Examiner*—Hezron E. Williams
*Assistant Examiner*—Richard A. Moller
*Attorney, Agent, or Firm*—Finnegan, Henderson, Farabow, Garrett & Dunner

[57] ABSTRACT

An optical transmission apparatus comprises an optical sender for transmitting a light intensity signal, acquired by direct modulation of light from a single mode semiconductor laser, through optical fibers, an optical amplifier for controlling transmission power through the optical fibers in accordance with a change in the dispersion characteristics of the optical fibers, and an optical receiver, connected via the optical fibers to the optical sender, for receiving the light intensity signal.

5 Claims, 10 Drawing Sheets

OPTICAL TRANSMISSION APPARATUS

This application is a continuation of application Ser. No. 08/118,768, filed Sep. 10, 1993, now abandoned.

BACKGROUND OF THE INVENTION

1. Field of the Invention

The present invention relates to an optical transmission apparatus, and, more particularly, to an optical transmission apparatus which performs optical transmission over an optical transmission passage without electric regeneration.

2. Description of the Related Art

There have been active studies and developments on optical communication techniques. Such active studies and developments on optical communication have been made due to the advantages of optical signal transmission over electric signal transmission in the transmission speed, the interference between signals, and so on. Under this circumstance, since an optical transmitter which transmits optical signals of a stable wavelength even under the modulation, ultra-high speed LSIs, optical amplifiers, etc., are developed, ultra-high speed optical fiber transmission without electric regeneration over several hundred kilometers at the rate of 10 Gb/s is going to be accomplished.

To transmit light signals modulated at the rate of over 1 Gb/s over a long distance without electric regeneration, an optical transmitter or an intermediate repeater sends light power of over several mW to a transmission optical fiber in order to extend the distance between repeaters or reduce the influence of spontaneous emission noise in optical amplifiers.

In the case of such high power transmission, the spectrum will be expanded during transmission by the nonlinearity of the optical fiber (Kerr effect). The Kerr effect is a phenomenon that the refractive index varies in proportion to the square of the electric field, and the proportional coefficient or the nonlinear refractive index $n_2$ has a value of about $3.2 \times 10^{-6}$ cm$^2$/W in the optical fibers. Therefore, a strong and short light pulse after fiber transmission has a long wavelength at the rising and a short wavelength at the falling. In other words, self phase modulation occurs. In the optical fibers, therefore, a light pulse with a wavelength indicating anomalous dispersion is compressed while a light pulse with a normal dispersion wavelength is expanded.

The received eye pattern is the widest when proper pulse compression is applied. To eliminate the influence of the Kerr effect and keep the bit error rate low, therefore, the wavelength dispersion should be set within a predetermined range in the vicinity of the optimum value. In particular, to accomplish long-distance transmission using optical amplifiers without electric regeneration, the wavelength dispersion allowance to achieve a low bit error rate becomes narrower.

As the dispersion characteristic and nonlinearity of optical fibers vary slightly depending on a change in the environmental conditions or on the maintenance, it is generally difficult to control the characteristic of the optical fibers once laid out. Normally, the oscillation wavelength is controlled so as to provide a predetermined wavelength dispersion by changing the heat sink temperature of a laser as the light source of an optical transmitter.

But, the temperature-based control has a large time delay (several seconds), so that continuous and stable automatic control is difficult to achieve. In an optical fiber transmission system constituted of a plurality of sections separated by optical repeaters, the optimum wavelength dispersion value varies slightly from one section to another. The optimum control section by section cannot be accomplished through wavelength control. Further, since the optimum wavelength range is narrow for the laid fibers, the number of channels that can be wavelength-division-multiplexed is limited.

As described above, the conventional optical transmission apparatus has a shortcoming such that it is difficult to accomplish continuous and stable automatic control so as to maintain the optimum eye pattern with respect to a change in the characteristic of optical fibers.

SUMMARY OF THE INVENTION

It is therefore an object of the present invention to provide an optical transmission apparatus which can easily keep the optimum eye pattern even when the characteristic of optical fibers varies.

To achieve this object, according to one aspect of this invention, there is provided an optical transmission apparatus comprising an optical transmitter for transmitting a light intensity modulation signal, acquired by direct modulation of a single mode semiconductor laser; an optical receiver, connected via optical fibers to the optical transmitter, for receiving the light intensity modulation signal; and a regulator for performing feedback control of the transmission power of the light intensity modulation signal to the optical fibers.

According to another aspect of this invention, there is provided an optical transmission apparatus comprising an optical transmitter for wavelength-division-multiplexing a plurality of light intensity signals acquired by direct modulation of single mode semiconductor lasers, and transmitting the wavelength-division-multiplexed signals to optical fibers; a regulator for regulating individual power transmission of the plurality of light intensity modulation signals to the optical fibers in accordance with a difference in characteristic wavelengths of the optical fibers; and an optical receiver, connected via the optical fibers to the optical transmitter, for receiving the plurality of light intensity modulation signals.

The eye pattern is influenced by dispersion of the optical fibers, self phase modulation, and a wavelength chirp caused by the direct modulation of the semiconductor laser. As the transmission power of the light intensity signal to be transmitted to the optical fibers increases, the influence of the self phase modulation becomes greater than that of the wavelength chirp.

In self phase modulation, a light pulse is compressed at the wavelength where the optical fibers show anomalous dispersion, and a light pulse is expanded at the wavelength where the optical fibers show normal dispersion. In the case of the wavelength chirp originated from direct modulation, a light pulse is expanded at the wavelength where the optical fibers show anomalous dispersion, and is compressed at the wavelength where the optical fibers show normal dispersion.

The eye pattern is improved when a light pulse is compressed properly. When the characteristic of the optical fibers, which was in a good state with respect to the eye pattern, changes in the direction to show anomalous dispersion, the transmission power is raised to enhance the influence of self phase modulation relative to the light pulse, thus enhancing the compression of the light pulse. If that characteristic changes in the reverse direction, the transmission power is reduced to enhance the influence of the wavelength chirp relative to the light pulse, thus enhancing the compression of the light pulse. This control on the transmission power can always yield an excellent eye pattern, and, unlike the control of the heat sink temperature, has no large time delay.

The automatic control of transmission power to the optical fibers can easily be achieved by changing the gain of the optical amplifiers. Since the transmission power to the optical fibers can be controlled for each repeater, the optimum control for each section can be executed.

In wavelength-division-multiplexed (WDM) optical fiber transmission, the optimum dispersion value of individual channel can be approximately matched with the wavelength dispersion value for the individual channel by adjusting the transmission power to the optical fibers of the individual channel. It is therefore possible to increase the number of WDM channels that can accomplish high-speed long-distance transmission.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
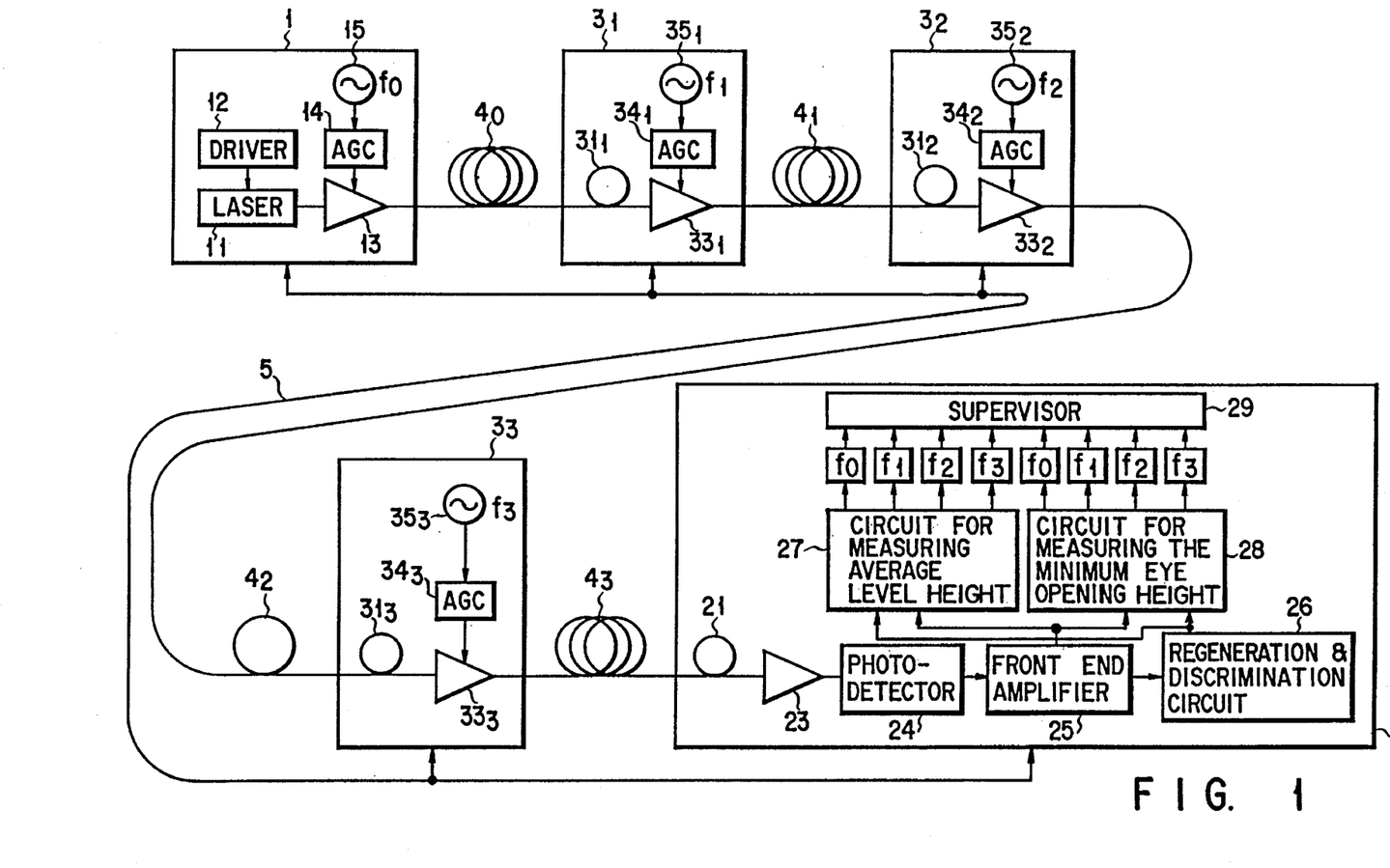
FIG. 1 is a diagram illustrating the schematic structure of the essential portions of an optical transmission apparatus according to a first embodiment of the present invention.

FIG. 1 illustrates the essential portions of an optical transmission apparatus with a transmission rate of 10 Gb/s according to the first embodiment of the present invention. In this diagram, the electric system and detailed optical parts, such as an optical isolator and a monitor system, are not shown.

This optical transmission apparatus mainly comprises an optical sender 1, an optical receiver 2, optical repeaters $3_1$, $3_2$ and $3_3$ and dispersion-shifted optical fiber for transmission (hereinafter also called "transmission optical fibers") $4_0$, $4_1$, $4_2$ and $4_3$. The distance between the optical sender 1 and the repeater $3_1$ and between the adjoining repeaters $3_1$ to $3_3$ are each about 100 km, so that transmission over a total of 400 km is possible without electric regeneration by using three stages of optical repeaters $3_1$, $3_2$ and $3_3$.

The light source of the optical sender 1 is a strained quantum well distributed feedback semiconductor laser (hereinafter also called "strained quantum well semiconductor laser") 11 having a small wavelength chirp among many semiconductor lasers. This semiconductor laser 11 has an oscillation wavelength of about 1.551 μm. The strained quantum well semiconductor laser 11 is subjected to modulation with a 10-Gb/s signal by a driver 12. The optical output of the semiconductor laser 11 is amplified by an erbium (Er) doped optical fiber amplifier (hereinafter also called "optical fiber amplifier") 13, and is then transmitted to the transmission optical fiber $4_0$. The optical fiber amplifier 13 comprises an erbium doped optical fiber excitation semiconductor laser, an optical demultiplexer/multiplexer, an optical isolator, and so on. The optical sender 1 further comprises a gain controller 14, connected to optical fiber amplifier 13, and a sinewave power source 15 with a low frequency $f_0$. The gain controller 14 controls the gain of the erbium doped optical fiber via the output of the excitation semiconductor laser. The gain of the optical fiber amplifier 13 is finely modulated by the sinewave power source 15, so that the output power of the optical fiber amplifier 13 is also finely modulated with $f_0$.

The optical repeaters $3_1$, $3_2$ and $3_3$ respectively include Er doped optical fiber amplifiers $33_1$, $33_2$ and $33_3$, gain controllers $34_1$, $34_2$ and $34_3$, and sinewave power sources $35_1$, $35_2$ and $35_3$ with frequencies $f_1$, $f_2$ and $f_3$. The gains of the optical repeaters $3_1$, $3_2$ and $3_3$ are finely modulated by the sinewave power sources $35_1$, $35_2$ and $35_3$, so that the output powers of the optical repeaters $3_1$, $3_2$ and $3_3$ are also finely modulated with $f_1$, $f_2$ and $f_3$.

The optical receiver 2 comprises an optical preamplifier 23, a photodetector 24, a front end amplifier 25 and a regenerator/discriminator 26. The front end amplifier 25 is connected to a circuit 27 for measuring the average level height and a circuit 28 for measuring the minimum eye opening height. Since the regenerator/discriminator 26 includes an AGC (Automatic Gain Control) function, no AGC is applied to the output of the front end amplifier 25. Therefore, the average level height measuring circuit 27 measures the difference between the average "1" level and average "0" level of the received light in a discrimination time window. The eye opening height measuring circuit 28 measures the difference between the minimum "1" level and the maximum "0" level. Here, it is assumed that the "1" level is higher than the "0" level. The eye close ratio is determined by a ratio between the outputs of the average level height measuring circuit 27 and eye opening height measuring circuit 28.

The four outputs of the average level height measuring circuit 27 are connected to synchronous detectors respectively having center frequencies of $f_0$, $f_1$, $f_2$ and $f_3$. Likewise, the four outputs of the eye opening height measuring circuit 28 are connected to synchronous detectors respectively having center frequencies of $f_0$, $f_1$, $f_2$ and $f_3$. The relation between the gains of the Er doped optical fiber amplifiers 13, $33_1$, $33_2$ and $33_3$ and the eye close ratio can be detected by obtaining the outputs of the former four synchronous detectors with those of the latter four synchronous detectors corresponding to the former ones and a ratio therebetween. The outputs of those filters are monitored by a monitor and control section or a supervisor 29 which may be a suitably programmed computer.

The dispersion values of the zero-dispersion-wavelength-shifted optical fibers $4_0$, $4_1$, $4_2$ and $4_3$ for transmission are so set that the average wavelength dispersion falls within a range from +1.0 ps/nm/km to −1.0 ps/nm/km. But, the dispersion value varies from one section to another. In this respect, therefore, compensation optical fibers $31_1$, $31_2$, $31_3$ and 21 which have inverse dispersion characteristics to compensate for the total dispersion of the transmission optical fibers $4_0$, $4_1$, $4_2$ and $4_3$ under the standard conditions, are inserted in the optical repeaters $3_1$, $3_2$ and $3_3$ and the optical receiver 2.

The sign of the wavelength dispersion D is given in such a way that anomalous dispersion is positive. For instance, the wavelength dispersion of the transmission optical fiber $4_0$ is D=−1.0 ps/nm/km and the distance is 100 km, the total dispersion becomes −100 ps/nm. By inserting the non-dispersion-shifted optical fiber $31_1$ for compensation (hereinafter called "compensation optical fiber") with wavelength dispersion of 17 ps/nm/km in the input section of the optical repeater $3_1$, the total dispersion in the first section can be approximately set to a predetermined value. Since the amount of compensation for the compensation optical fibers $31_1$ to $31_3$ and 21 is fixed, the amount of compensation cannot be adjusted when the optimum condition changes from the initial state due to a change in environmental conditions.

Figure 2:
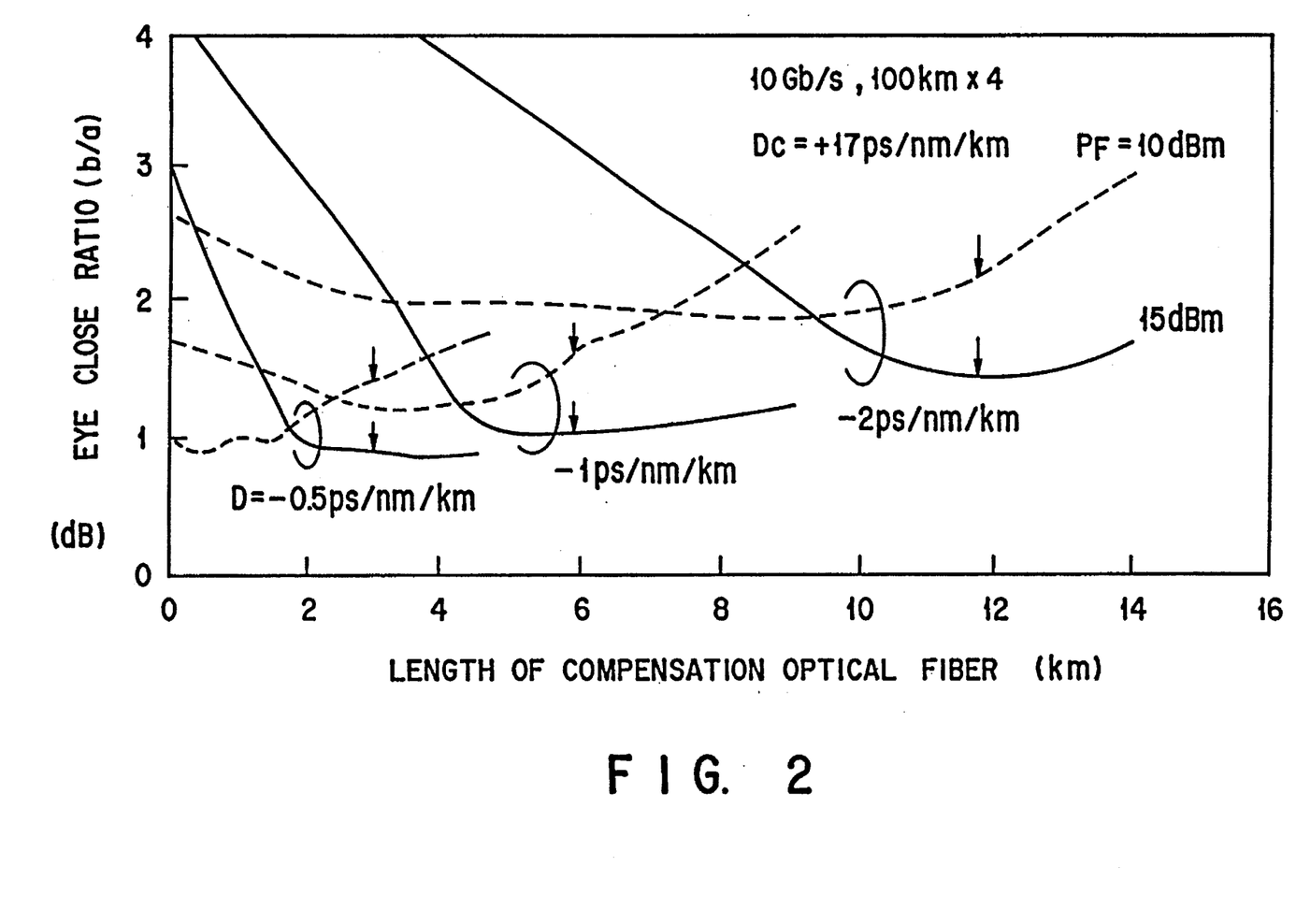
FIG. 2 is a characteristic chart showing the relation between the length of compensation optical fibers with anomalous dispersion and the eye closing value when transmission optical fibers with normal dispersion are used.

FIG. 2 illustrates the relation between the length of the compensation optical fibers $31_1$ to $31_3$ with anomalous dispersion (Dc=17 [ps/nm/km]) and the eye close ratio in the case of the transmission accomplished by the transmission optical fibers $4_1$ to $4_3$ having three different normal dispersion values (D=−0.5, −1 and −2 [ps/nm/km]).

In this diagram, the eye close ratio is given by the ratio of the average difference b between levels "1" and "0" to the size a of the eye opening corresponding to the pseudo random signal acquired over a discrimination time that is 20% of the time slot, expressed by the unit "dB." The opening size a and the average difference b can be measured by the eye opening measuring circuit 28 and the average output level measuring circuit 27, respectively.

In FIG. 2, the broken line indicates the characteristic when the optical fiber transmission power $P_F$ is 10 dBm and the solid line indicates the characteristic when the optical fiber transmission power $P_F$ is 15 dBm. The arrows indicate the lengths of the compensation optical fibers $3_1$ to $3_3$ and 21 at which the total dispersion of the transmission optical fibers $4_0$ to $4_3$ and the compensation optical fibers $3_1$ to $3_3$ and 21 becomes 0. The left side to each arrow is the region of normal dispersion, and the right side the region of anomalous dispersion.

It is apparent from FIG. 2 that the optimum range lies on the normal dispersion side to the point where the total dispersion is 0 when the optical fiber transmission power $P_F$ is 10 dBm whereas the optimum range is shifted to near the zero dispersion position when the optical fiber transmission power $P_F$ is 15 dBm.

With the wavelength dispersion of the transmission optical fiber being D=−1.0 ps/nm/km, therefore, the amount of compensation by the compensation optical fibers $31_1$, $31_2$, $31_3$ and 21 is set to about 70% (length of 4 km) of the value (arrow) that satisfies the full compensation condition of making the total dispersion to 0 and the optical fiber transmission power $P_F$ of the optical sender 1 is initially set to 13 dBm. When the total dispersion is shifted to the anomalous dispersion side (the right side), the transmission power $P_F$ is increased. When the total dispersion is shifted to the normal dispersion side (the left side), the transmission power $P_F$ is reduced. Under this control, the eye close ratio can always be kept low even if the characteristic of the transmission optical fibers $4_0$, $4_1$, $4_2$ and $4_3$ changes. In other words, the supervisor 29 controls the gain of each of the Er doped optical fiber amplifiers 13, $33_1$, $33_2$, and $33_3$ so as to set the monitoring eye close ratio at the minimum value, so that the above optimization is automatically realized.

Figure 3:
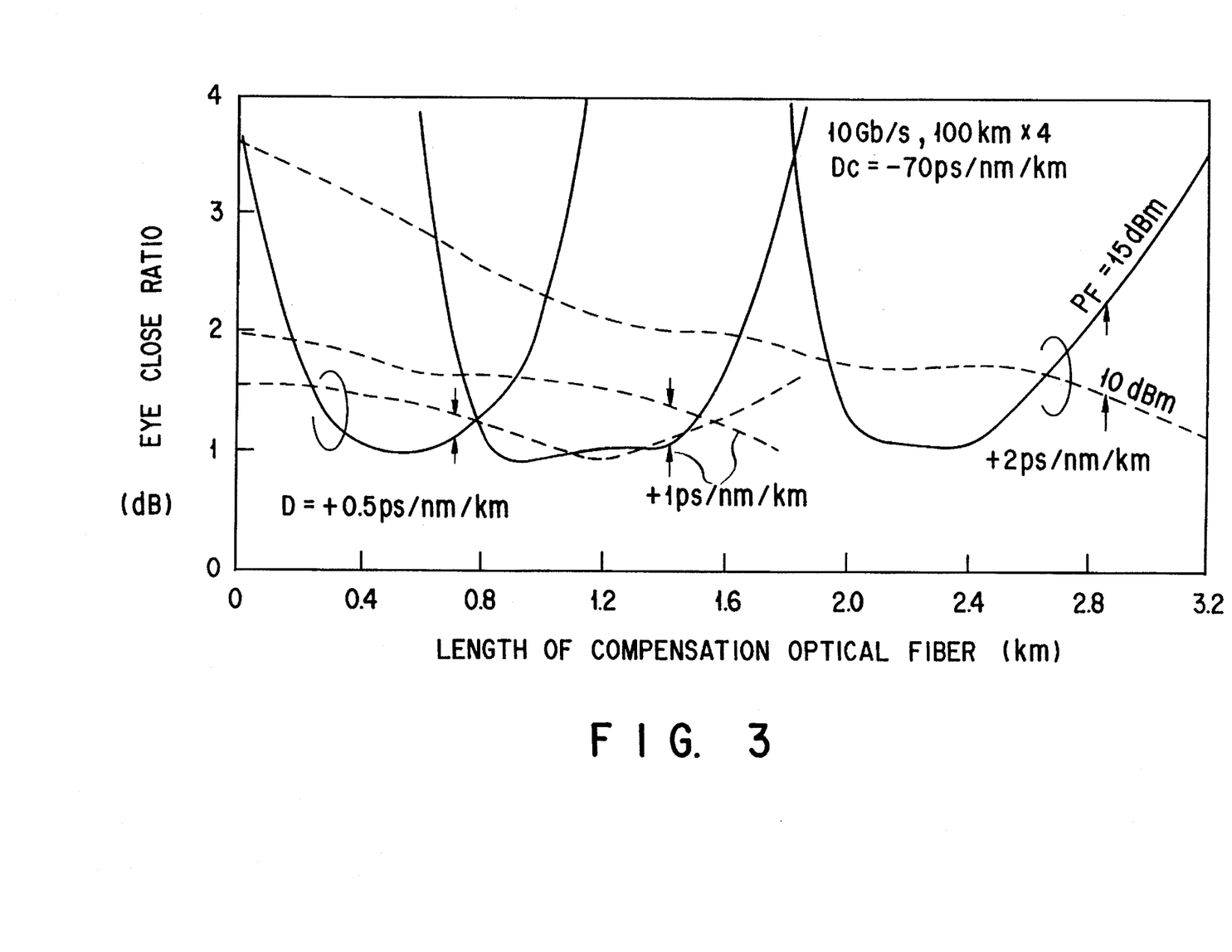
FIG. 3 is a characteristic chart showing the relation between the length of compensation optical fibers with anomalous dispersion and the eye closing ratio when transmission optical fibers with anomalous dispersion are used.

FIG. 3 illustrates the relation between the length of compensation optical fibers with normal dispersion and the eye close ratio when the transmission optical fibers $4_0$, $4_1$, $4_2$ and $4_3$ have anomalous dispersion. In FIG. 3, anomalous dispersion is on the left side to each arrow, and normal dispersion on the right side to each arrow.

With the transmission power of 10 dBm, the optimum range lies on the normal dispersion side to the zero point of the total dispersion. When the optical fiber transmission power $P_F$ is 15 dBm, the optimum range is shifted to the anomalous dispersion side. With the amount of compensation set to the total dispersion of 0 and transmission power initially set to 13 dBm, therefore, the transmission power should be increased when the total dispersion is shifted to the anomalous dispersion side, and the transmission power should be decreased when the total dispersion is shifted to the normal dispersion side.

The reason why the optimum dispersion compensation amount has a power dependency will be explained below.

The wavelength chirp originated from the direct modulation of the semiconductor laser is expressed by $$\Delta\lambda = -(\alpha\lambda^2/4c_0) \cdot \{d(\ln P)/dt + \kappa P\} \qquad (1)$$

where α (>0) is the linewidth enhancement factor, $c_0$ is the speed of light, P is an optical output, and K is a constant. In the equation, d/dt indicates differentiation.

The first term on the right-hand side of the equation (1) is called a transient chirp term, and the second term an adiabatic chirp term. Normally, when the strained quantum well laser is modulated at an ultrahigh speed, the transient chirp is dominant, and the adiabatic chirp term can be neglected.

This wavelength shift $\Delta\lambda$ becomes $\Delta\lambda<0$ or a blue shift at the rising of a pulse, and becomes $\Delta\lambda>0$ or a red shift at the falling of the pulse. Accordingly, pulse compression occurs at the normal dispersion. As the eye opening becomes wider at the proper pulse compression, the optimum dispersion value lies in a small normal dispersion wavelength region.

In self phase modulation caused by the Kerr effect of optical fibers, as described above, the wavelength shift becomes a red shift at the rising of a pulse and becomes a blue shift at the falling of the pulse. In other words, the sign of the wavelength change is the opposite to that of the wavelength chirp.

Since pulse compression occurs in the light pulse influenced by the self phase modulation in the case of anomalous dispersion, the optimum dispersion compensation value lies on the anomalous dispersion side. As the pulse power rises, the effect of the self phase modulation increases. The balancing of the self phase modulation with anomalous dispersion is therefore preferable to the balancing of the wavelength chirp with normal dispersion. Accordingly, as the transmission power increases, the optimum compensation amount is shifted to the anomalous dispersion side.

The supervisor 29 of the optical receiver 2 can continuously control the gains of the Er doped optical fiber amplifiers 13, 33$_1$, 33$_2$ and 33$_3$ via a supervising system 5 separate from the signal transmission system and gain controllers 14, 34$_1$, 34$_2$ and 34$_3$ located in the optical sender 1 and the optical repeaters 3$_1$, 3$_2$ and 3$_3$. By controlling the gains of the Er doped optical fiber amplifiers 13, 33$_1$, 33$_2$ and 33$_3$ so as to increase the received eye opening, the eye opening can be kept at the optimum state even when the characteristic of the transmission optical fibers 4$_0$, 4$_1$, 4$_2$ and 4$_3$ changes. Generally speaking, the time constant for a change in the optical fiber characteristic is long (several seconds), stable control is possible even with a long feedback system of several hundred km.

In the external modulation system, the optimum point lies on the anomalous dispersion side regardless of the optical fiber transmission power since the wavelength chirp is very small. Therefore, the transmission power dependency of the optimum compensation amount is small, so that the control of this embodiment is not so effective in the external modulation system.

According to this embodiment, even when the dispersion characteristic of the optical fibers changes, the transmission power to the optical fibers is adjusted accordingly to control the ratio of the influence of the self phase modulation to the influence of the wavelength chirp. This control can always set the light pulse to the properly compressed state, and thus can keep the eye opening to the optimum state. Further, unlike the wavelength control based on the heat sink temperature as done in the prior art, this control does not raise any problem of a time delay.

In the above-described embodiment, a variation of the optical fiber characteristic is smooth, for example, the dispersion change monitor system need not always be active, and may be activated only at the time of maintenance. In this case, the control system can be used in the time sharing manner. That is, the frequencies for the modulation of the gains of the optical amplifiers can be the same, and the average output level measuring circuit 27 and the eye opening measuring circuit 28 each need to have a single output.

Further, the dispersion amount of the optical fibers may be measured directly or the spectral change may be measured instead of measuring the eye close ratio, so that the gains of the optical amplifiers can be controlled based on the result of the measurement. Instead of the supervising line 5, a transmission optical fiber for a return path can be used.

Figure 4A:
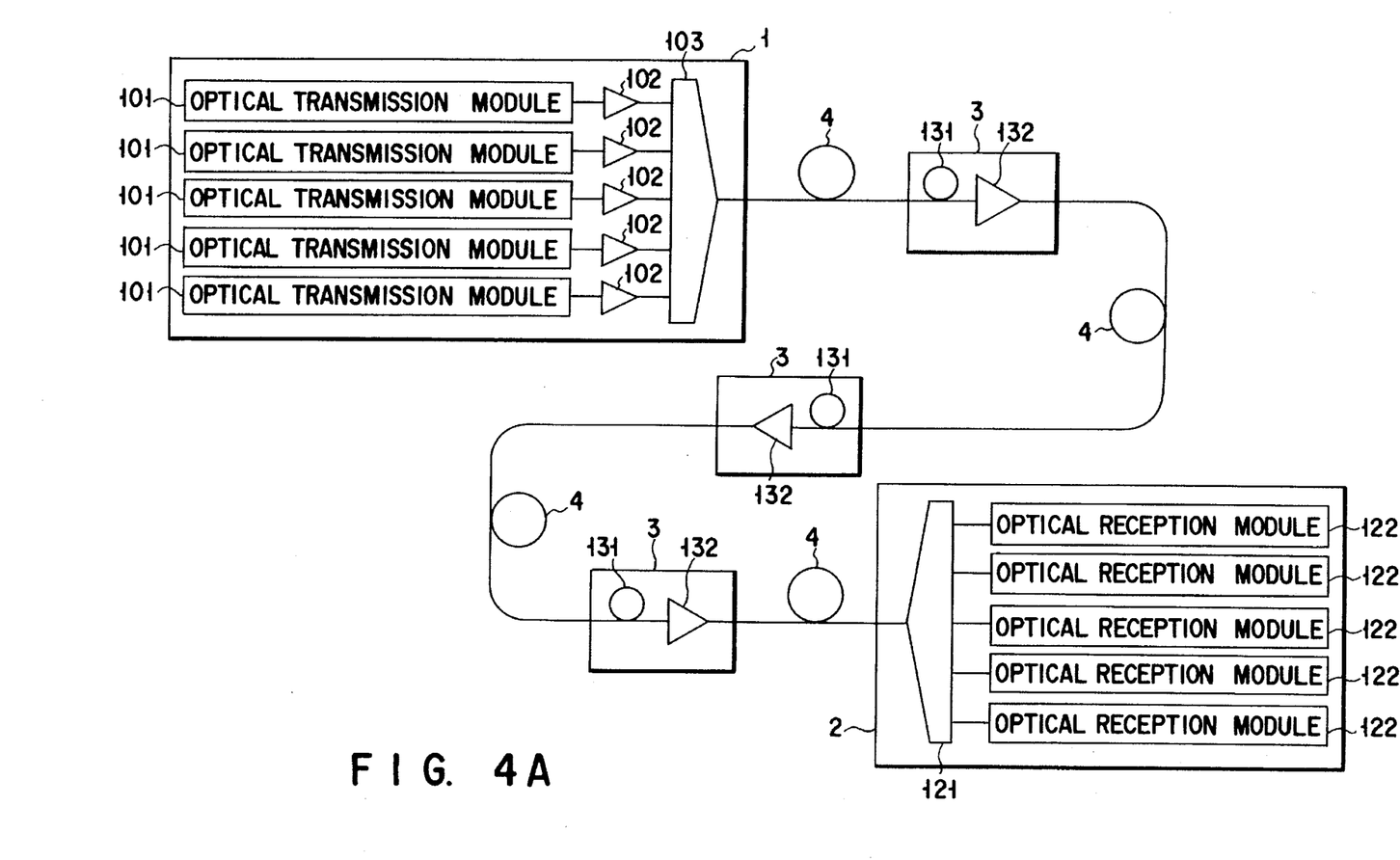
FIG. 4A is a diagram illustrating the structure of the essential portions of an optical transmission apparatus according to a second embodiment of the present invention.

FIG. 4A illustrates the structure of the essential portions of a 10-Gb/s, 5 channel wavelength-division-multiplexed type optical transmission apparatus according to the second embodiment of the present invention. In this diagram, only the main portions association with optical transmission are shown, while the monitor and control system, electric signal processing system, peripheral equipments, optical isolators, light sources for exciting the optical amplifiers, filters and so on are not shown. FIG. 4A uses like or same reference numerals or symbols as used in FIG. 1 to denote corresponding or identical portions, to avoid their detailed description.

This optical transmission apparatus mainly comprises an optical sender 1, an optical receiver 2, optical repeaters 3 and transmission optical fiber cables 4. In the optical transmission apparatus of this embodiment, five-wavelength lights are multiplexed and the total signal capacity is 50 Gb/s.

The transmission optical fiber cables 4 are dispersion shift fibers whose average zero dispersion wavelength $\lambda_0$ is around 1.55 μm. The repeating distance is about 100 km, so that transmission over a total of 400 km is possible without electric regeneration by using three stages of optical repeaters.

The optical sender 1 includes five direct modulation type optical transmission modules 101. The light source for those modules 101 is a strained quantum well distributed feedback single mode laser having a small wavelength chirp at the time of modulation. About 1% of compressive strain is given to the InGaAs well layer of this strained quantum well laser. An optical amplifier 102 is connected to the output section of each direct modulation system optical transmission module 101. The optical fiber transmission power can be controlled within a range of 0 to +15 dBm by controlling the gains of the optical amplifiers. The lights with individual wavelengths from the optical amplifiers 102 are multiplexed by an optical multiplexer 103 and the resultant signal is sent on the transmission optical fiber 4.

The optical receiver 2 has an optical demultiplexer 121 and five optical reception modules 122 with optical pre-amplifiers. The optical demultiplexer 121 separates the lights with the individual wavelengths from the multiplexed signal. Ordinary transmission optical fibers have second order dispersion of about S=0.05 ps/nm$^2$/km, and the normal dispersion is on the short-wavelength side of the zero dispersion wavelength while the anomalous dispersion is on the long-wavelength side. In this embodiment, the wavelength duration is 2.5 nm, the wavelength dispersion value of the shortest wavelength channel is +0.5 ps/nm/km and the wavelength dispersion value of the longest wavelength channel is 1.0 ps/nm/km. The total dispersion per section is 50 ps/nm for the shortest wavelength channel and 100 ps/nm for the longest wavelength channel.

Each optical repeater 3 includes a compensation fiber 131 and an optical amplifier 132, which compensate for the dispersion and loss of the transmission optical fiber 4 at the preceding stage, respectively. The compensation fiber 131 is a special optical fiber having a length of 1 km and wavelength dispersion of about −70 ps/nm/km. The total dispersion compensation amount, which slightly differs depending on the wavelength, is about −70 ps/nm.

It is apparent from FIG. 3 that if the optical fiber transmission power for the shortest wavelength channel is 10 dBm and the transmission power for the longest wavelength channel is 15 dBm, a smooth eye with an eye close ratio of about 1 dB can be provided in either case. The transmission power for the intermediate channels should be set to the value between the power of the longest wavelength channel and that of the shortest wavelength channel.

According to this embodiment, the optimum eye opening can be established for each channel even with a difference in wavelength dispersion value by setting the transmission power of the longest wavelength channel greater than that of the shortest wavelength channel.

Figure 4B:
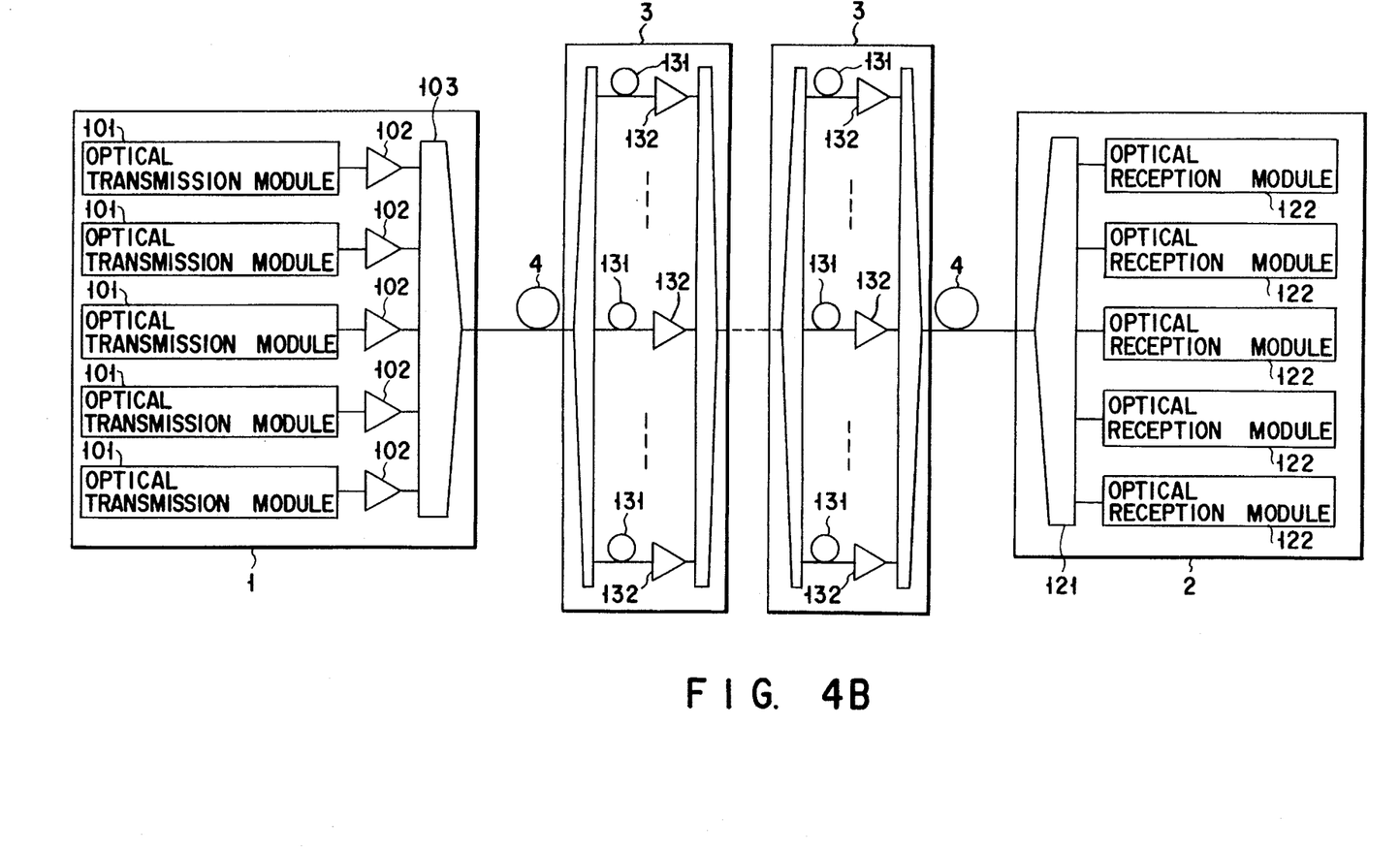
FIG. 4B is a modification of the optical transmission apparatus shown in FIG. 4A.

In this embodiment, the transmission rate may be changed depending on the wavelength, different wavelength separations may be set (four-wave mixing is difficult to occur), or the total transmission distances of the individual channels may be changed. Although the multiple wavelengths are simultaneously amplified in one optical repeater 3 in this embodiment, they may be amplified by different optical amplifiers for the respective channels using an optical demultiplexer/multiplexer as shown in FIG. 4B. In other words, the multiplexed output of the optical multiplexer 103 of the optical sender 1 is sent to the optical repeater 3 via the transmission optical fiber 4. The optical repeater 3 comprises a demultiplexer, a plurality of optical repeating circuits connected to the output terminals of the demultiplexer, for amplifying the multiple wavelengths, respectively, each of the optical repeating circuits including a compensation fiber 131 and an optical amplifier 132, and a multiplexer connected to the output terminals of the optical repeating circuits, the output terminal of the multiplexer being connected to the next stage optical repeater 3 via the transmission optical fiber 4. The multiplexer of the last stage optical repeater 3 is connected to the demultiplexer 121 of the optical receiver 2 via the transmission optical fiber 4.

Further, the continuous output control may be performed for each wavelength or the optimum output control may be performed for each section as the first embodiment. Furthermore, when special fibers like flat dispersion fibers are used, the optical fiber transmission power should be set in accordance with the dispersion value, not the wavelength.

Figure 5:
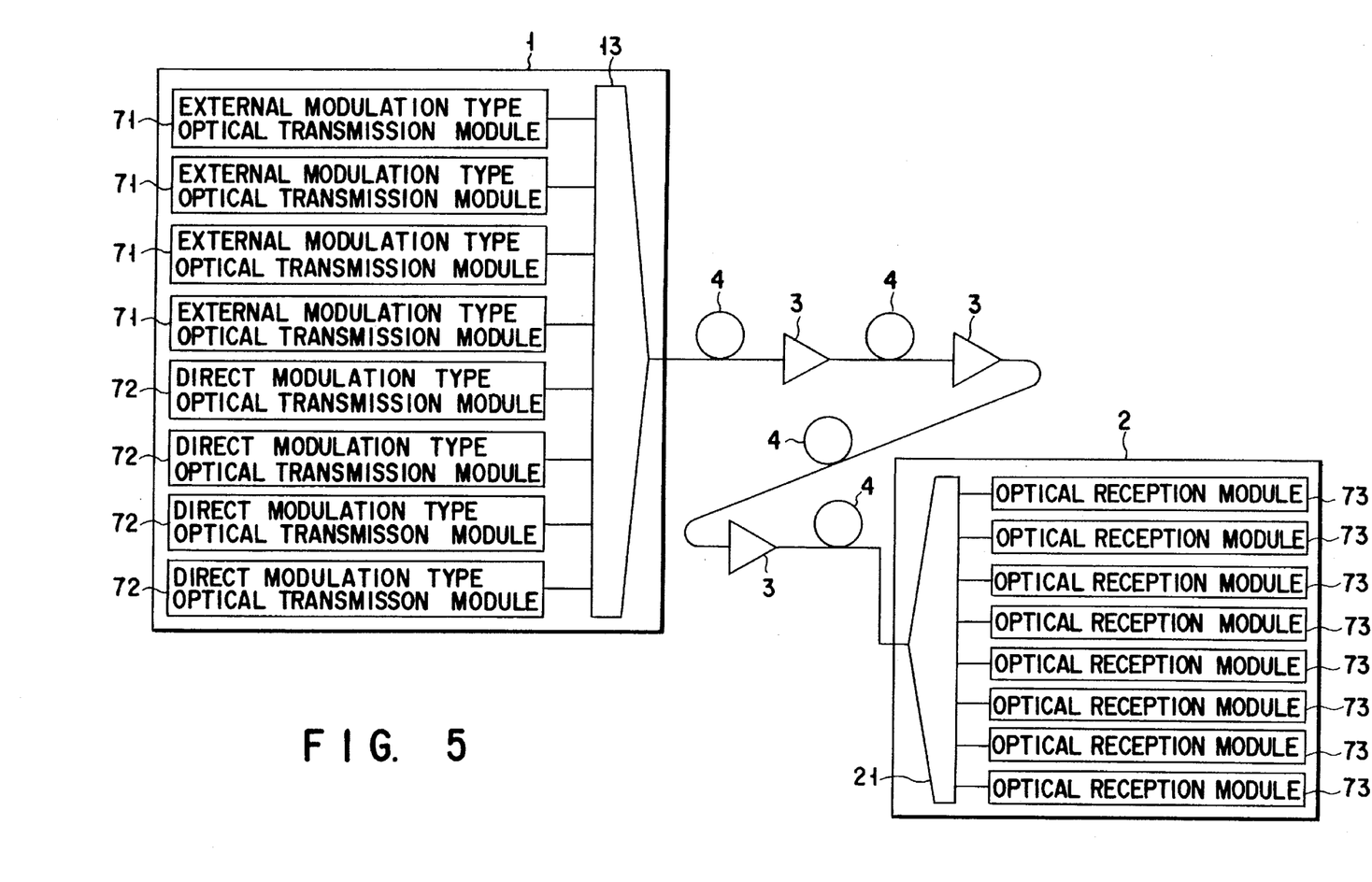
FIG. 5 is a diagram illustrating the structure of the essential portions of an optical transmission apparatus according to a third embodiment of the present invention.

FIG. 5 illustrates the schematic structure of a 10-Gb/s×8 WDM optical transmission apparatus according to the third embodiment of the present invention. In this diagram, only the main portions association with optical transmission are shown, while the monitor and control system, electric signal processing system, peripheral equipments, optical isolators, excitation light sources, filters and so on are not shown. FIG. 5 uses like or same reference numerals or symbols as used in FIG. 1 to denote corresponding or identical portions, to avoid their detailed description.

In the optical transmission apparatus of this embodiment, the repeater distance is about 100 km, so that transmission over a total of 400 km is possible without electric regeneration by using three stages of optical repeaters. Further, eight-wavelength lights are multiplexed and the total signal capacity is 80 Gb/s.

The optical sender 1 includes four external modulation optical transmission modules 71 and four direct modulation optical transmission modules 72. The transmission optical fiber cables 4 are dispersion shifted fibers whose average zero dispersion wavelength $\lambda_0$ is around 1.545 µm.

Figure 6:
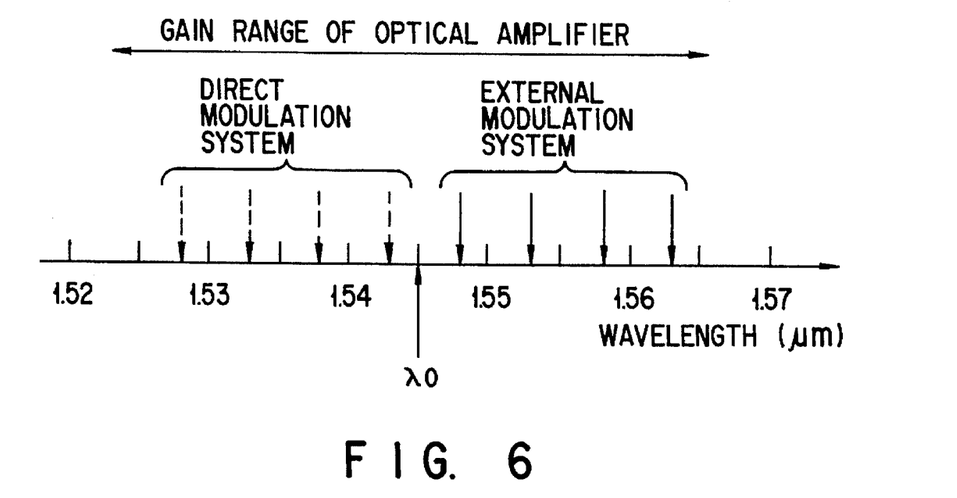
FIG. 6 is a diagram showing the distribution of oscillation wavelengths of the optical transmission apparatus in FIG. 5.

FIG. 6 shows the distribution of oscillation wavelengths in this embodiment. The oscillation wavelengths of the external modulation type optical transmission modules 71 are set to about 1.548 µm, 1.553 µm, 1.558 µm, and 1.563 µm, while the oscillation wavelengths of the direct modulation type optical transmission modules 72 are set to about 1.543 µm, 1.538 µm, 1.533 µm, and 1.528 µm.

Although a Mach-Zehnder type modulator using $LiNbO_3$ is used as the external modulator of the external modulation type optical transmission module 71, a semiconductor electric field absorption type modulator may also be used. The light source for the external modulation type optical transmission modules 71 in use is a distributed feedback type single mode semiconductor laser.

The light source for the direct modulation type optical transmission modules 72 is a distributed feedback type single mode strained quantum well laser having a small wavelength chirp at the time of modulation. About 1% of compressive strain is given to the InGaAs well layer.

Figure 7A:
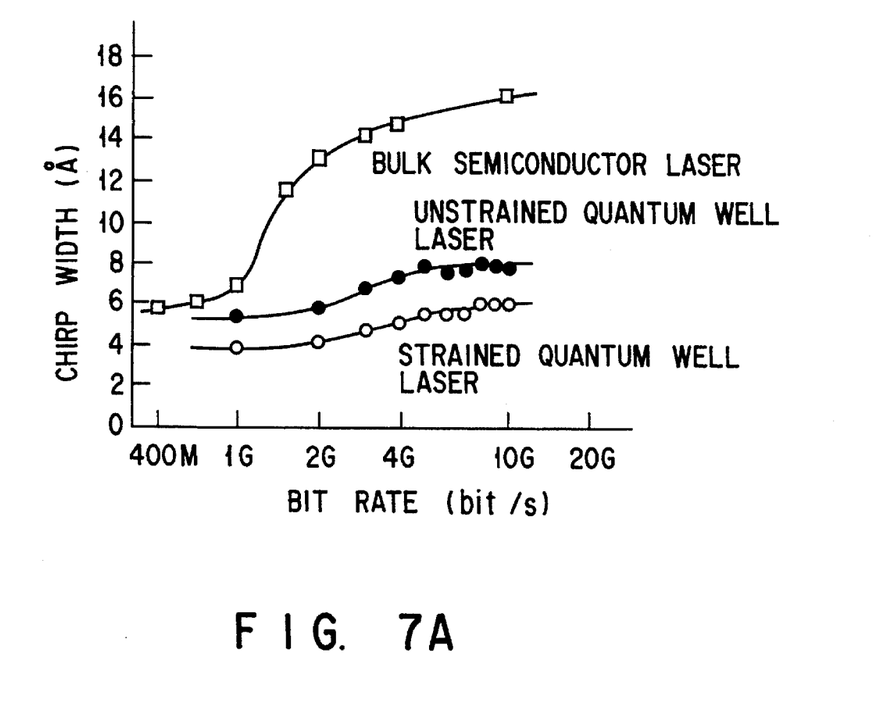
FIGS. 7A and 7B are diagrams showing the wavelength chirps of a strained quantum well laser in comparison with those of a unstrained quantum well laser and a bulk semiconductor laser.
Figure 7B:
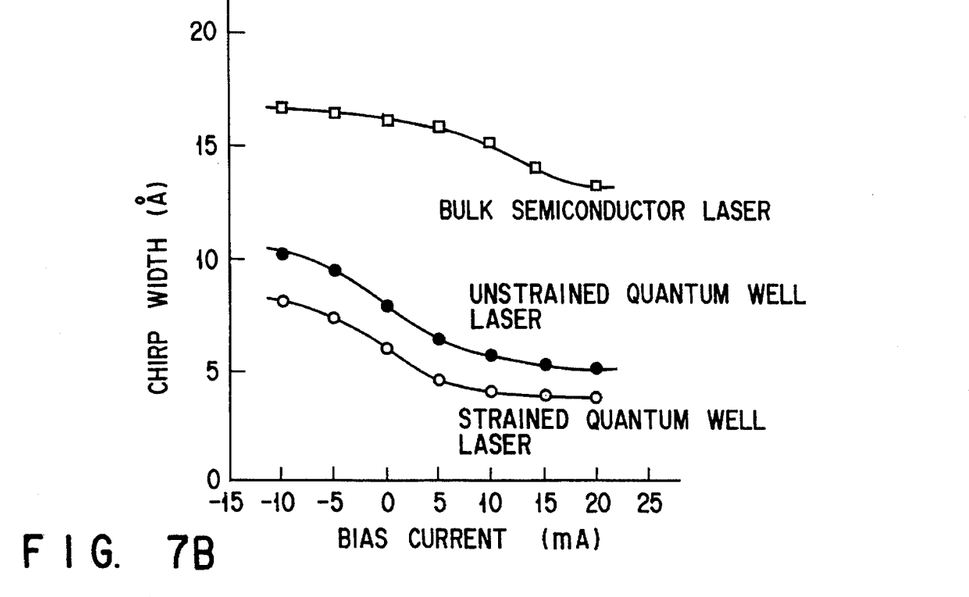

FIGS. 7A and 7B show the sizes of the wavelength chirp of a strained quantum well laser in comparison with those of an unstrained quantum well laser and a bulk semiconductor laser.

FIG. 7A shows the transmission rate dependency of the wavelength chirp when the bias current (Ib) matches with the oscillation threshold (Ith), and FIG. 7B shows the bias current (Ib-Ith) dependency of the wavelength chirp at the time of modulation at 10 Gb/s. The modulation amplitude is 40 mA, and the wavelength chirp is defined by the widths of −20 dB of the time-averaged spectrum. The wavelength chirp under 10 Gb/s modulation of the strained quantum well laser when the bias current is set to 5 mA above the oscillation threshold is about 0.4 nm.

It is apparent from FIG. 7A that the strained quantum well laser has a smaller chirp width than the unstrained quantum well laser or the bulk semiconductor laser regardless of the bit rate. It is apparent from FIG. 7B that the strained quantum well laser has a smaller chirp width than the unstrained quantum well laser or the bulk semiconductor laser regardless of the bias current.

Each of the modules 71 and 72 have an optical amplifier connected to the output section, and can transmit light of about 10 dBm. The lights with the individual wavelengths are multiplexed by the multiplexer 13 and the multiplexed signal is then sent to the transmission optical fiber 4. In consideration of the insertion loss of the multiplexer 13 and the branching for monitoring, the output of each wavelength that is sent to the repeater optical fiber 4 is about 8 dBm and the total output is about 17 dBm.

The optical receiver 2 has an optical demultiplexer 21 and eight optical detector modules 73 with optical pre-amplifiers, and can separately receive lights with the individual wavelengths. The optical repeaters 3 each have an optical amplifier to compensate for a loss of the optical fiber in the preceding stage.

If an Er doped optical fiber amplifier added with $Al_2O_3$ is used, the wavelength-multiplexed light with wavelengths from 1.528 µm to 1.563 µm can be amplified simultaneously. Alternatively, the individual wavelengths may be separated first, the resultant lights with the separated wavelengths may be amplified by a plurality of optical amplifiers, and then the amplified lights may be wavelength-multiplexed again. The optical amplifiers may be arranged in series in multiple stages. To eliminate noise light caused by spontaneous emission, it is desirable that a wavelength filter that passes only a signal with the wavelength of each channel. The repeater output of the light signal of each wavelength is about 8 dBm. The total output for the entire wavelengths is about 17 dBm.

Figure 8:
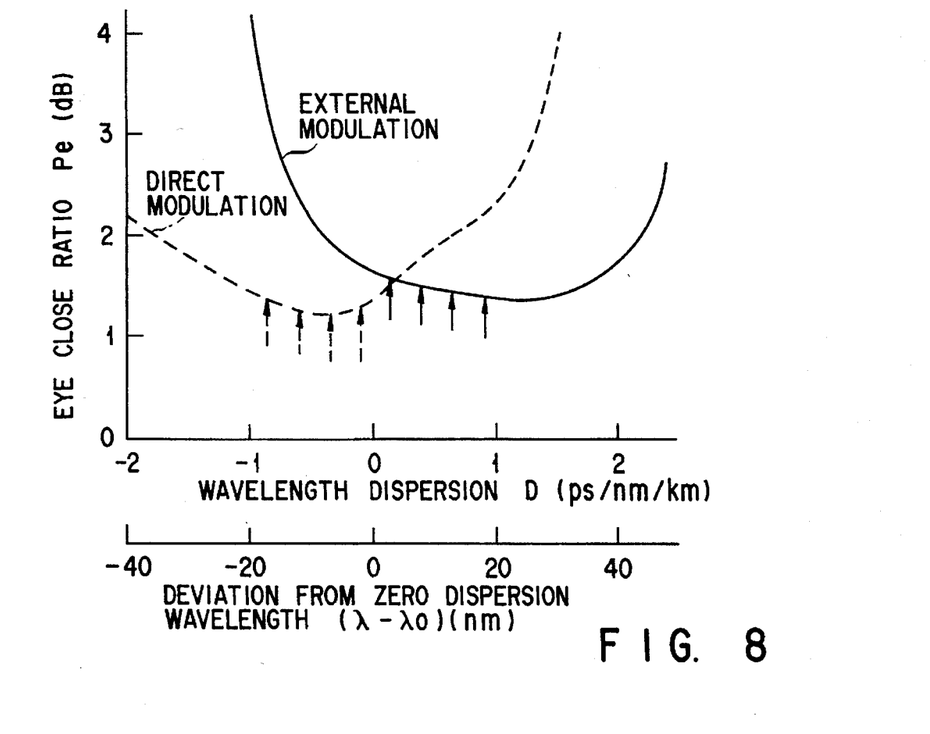
FIG. 8 is a characteristic chart showing the relation between the eye close ratio and the wavelength dispersion of optical fibers.

FIG. 8 is a characteristic chart showing the relation between the eye opening penalty Pe of the optical receiver 2 after reception and the wavelength dispersion D of optical fibers. In the diagram, the solid line indicates the characteristic based on the external modulation, while the broken like indicates the characteristic based on the direct modulation.

The eye close ratio is defined by Pe (unit: dB)=−10 log 10 (a/b) where "a" is the size of the eye opening acquired over a discrimination time that is 20% of the time slot, and "b" is the average difference between levels "1" and "0" over this discrimination time. The band for the optical receiver is 10 GHz. The sign of the wavelength dispersion D is given in such a way that anomalous dispersion is positive. The second order dispersion S is about 0.05 ps/nm²/km, and 1 ps/nm/km is equivalent to 20 nm in terms of a shift from the zero dispersion wavelength $\lambda_0$.

It is understood from this diagram that with a wavelength D>0, the eye opening penalty becomes lower in the external modulation. This is because the proper pulse compression effect can be obtained by balancing the self phase modulation due to the Kerr effect with the anomalous dispersion. At the normal dispersion, the pulse expands due to the self phase modulation and the eye is closed. If the anomalous dispersion is too strong, on the other hand, one pulse is separated into many small pulses (modulation instability), thus widening the tracing of the eye.

The wavelength chirp originated from the direct modulation has a short wavelength at the pulse rising and a long wavelength at the pulse falling. This is the opposite to the wavelength shift caused by the self phase modulation, and Pe becomes small at D<0.

In other words, the proper pulse compression effect can be obtained by balancing the wavelength chirp with the normal dispersion. In this case, however, the eye is closed due to the expansion of the pulse at the anomalous dispersion wavelength. The studies of the present inventor show that because the self phase modulation and the wavelength chirp do not cancel out each other completely, the transmission power dependency is strong and it is practically difficult to open the eye as compared with the case of the normal dispersion.

The arrows in FIG. 8 indicate the wavelength distribution of this embodiment. If the wavelength separation is too narrow, the four-wave mixing would cause crosstalk between wavelengths or severe specifications would be required for the optical multiplexer. It is therefore difficult to accomplish high-density multiplexing by narrowing the wavelength separation.

In the case of only the direct modulation system or the external modulation system, many channels cannot be arranged in the wavelength region where the eye opening penalty Pe is low.

According to this embodiment, however, since the external modulation system is used on the long wavelength side and the direct modulation system is used on the short wavelength side, many channels can be provided without increasing the penalty of each channel. In the external modulation system, channels are not provided on the longer wavelength side than the optimal wavelength in order to restrict the band of the optical amplifiers.

Accordingly, this embodiment can permit the use of a wider wavelength range than the case where only one of the external modulation system and direct modulation system is used, thus improving the degree of the wavelength multiplexing of a wavelength division multiplexing, ultra-high speed long distance optical transmission apparatus. This can ensure long distance transmission of a greater amount of information at a lower cost.

The characteristic in FIG. 8 is just one example, and the relation between the wavelength dispersion D and the eye opening penalty Pe varies in accordance with the transmission power to the optical fibers, modulation waveforms, the parameters of the fibers, etc. To transmit a vast amount of information per channel, e.g., 5 Gbits per second or more, the light signal channels should be multiplexed as follows.

With $\lambda_1$ being a predetermined wavelength in a range from the average zero dispersion wavelength $\lambda_0$ of the optical fibers in use in wavelength multiplexed optical transmission to ±5 nm, at least one channel for which electric signals are converted into light signals by the external modulator is arranged on the long wavelength side to $\lambda_1$, and at least one channel for which electric signals are converted into light signals by the directly modulation of the semiconductor laser is arranged on the short wavelength side to $\lambda_1$.

This channel arrangement is employed because the optimum wavelength for long distance transmission of light signal modulated at an ultra-high speed by the direction modulation of the low-chirp semiconductor laser lies on a shorter wavelength side than the zero dispersion wavelength. This is found by the present inventor. Generally, the optimum wavelength lies on the normal dispersion side for the direct modulation and lies on the anomalous dispersion side for the external modulation.

If the transmission power is too low, the S/N (Signal-to-Noise) ratio of the optical amplifiers becomes lower, and if the transmission power is too high, the distortion of the waveform and spectrum increases due to the Kerr effect. Thus, there should be the optimum range for the transmission power.

Figure 9:
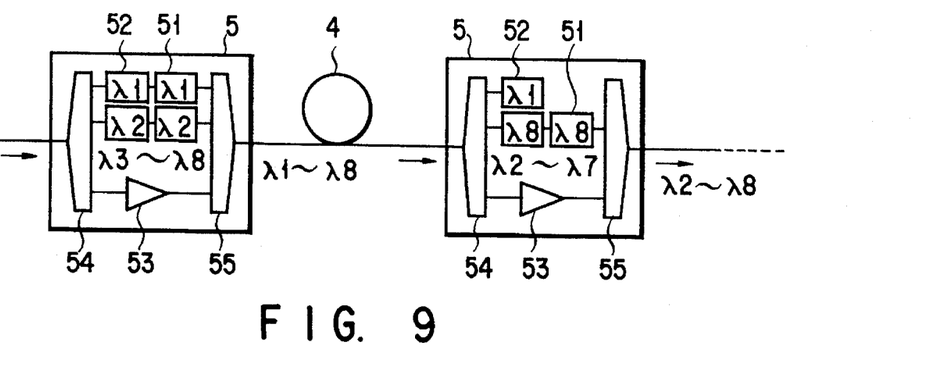
FIG. 9 is a diagram showing a modification of the optical transmission apparatus in FIG. 5.

In this embodiment, the transmission speed may be changed according to the wavelength, or the wavelength separation may not be fixed (four wave mixing is difficult to occur). Further, the transmission distances for the individual channels may be changed as shown in FIG. 9. In the case of FIG. 9, a terminal device 5 performs channel branching and channel combination by means of an optical demultiplexer 54 and an optical multiplexer 55, and serves as an optical sender 51 or an optical receiver 52 for a certain wavelength and as an optical repeater 53 for the other wavelengths.

Figure 10:
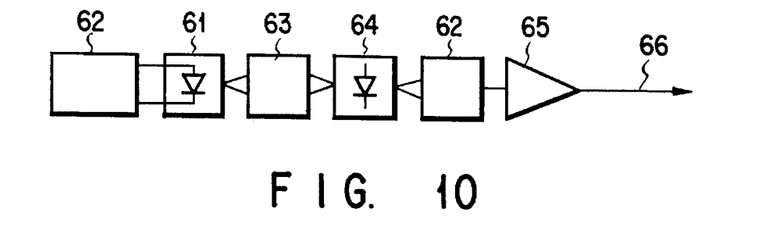
FIG. 10 is a diagram illustrating the structure of the essential portions of an optical transmission apparatus according to a fourth embodiment of the present invention.

FIG. 10 illustrates the structure of a 2.5-Gb/s optical transmission apparatus according to the fourth embodiment of the present invention. In this diagram, the electric system and detailed optical parts are not shown.

In the diagram, a light source 61 is constituted of a distributed feedback type strained quantum well semiconductor laser having a small wavelength chirp. The strained quantum well semiconductor laser 61 is subjected to modulation with a 2.5-Gb/s signal by a driver 62. The optical output of the strained quantum well semiconductor laser 61 is sent to a traveling-wave type semiconductor laser amplifier 64 via an optical system 63, which includes an optical isolator. The output of this amplifier 64 is amplified by an Er doped optical fiber amplifier 65 to or above the level of an average output of 10 dBm and is then transmitted to a transmission optical fiber 66.

The wavelength shift originated from the direct modulation of the semiconductor laser is expressed by $$\Delta\lambda = -(\alpha\lambda^2/4c_0)\cdot(d(\ln P)/dt + \kappa P) \qquad (1)$$

where $\alpha$ (>0) is the linewidth enhancement factor, $c_0$ is the speed of light, P is an optical output, and $\kappa$ is a constant. In the equation, d/dt indicates differentiation.

The first term on the right-hand side of the equation (1) is called a transient chirp term, and the second term an adiabatic chirp term. Normally, when the strained quantum well laser is modulated at an ultrahigh speed, the transient chirp is dominant, and the adiabatic chirp term can be neglected.

The gain G ($=P_o/P_{in}$) of the semiconductor laser amplifier 64 is given by $G=G_O/(1+P_o/P_{SAT})$ where $G_O$ is a unsaturated gain, $P_{in}$ is an optical input, $P_o$ is an optical output and $P_{SAT}$ is a saturated output. This relation can be rewritten as:

$$P_o = (4G_0 P_{in} P_{SAT} + P_{SAT}^2/4)^{1/2} - P_{SAT}/2 \qquad (2)$$

Figure 11:
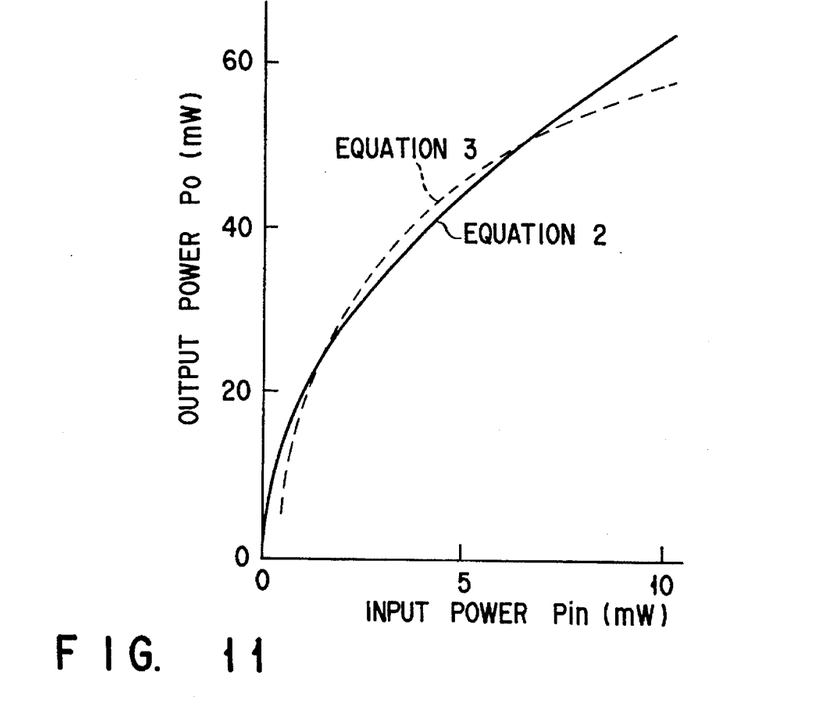
FIG. 11 is a characteristic chart showing the relation between input power and output power.

The solid line in FIG. 11 shows the relation between the optical input and optical output in the equation (2) when $G_0=100$ and $P_{SAT}=1$ mW. The broken line in FIG. 11 shows the optical input/output characteristic in the following equation (3) when $P_v=1$ mW, $P_A=40$ mW and $P_c=17.5$ mW.

$$P_o = P_A \log_{10}(P_{in}/P_v) + P_c \qquad (3)$$

Although the optical input/output characteristic of the equation (2) does not have as a sharp saturation characteristic as that of the equation (3), the equation (3) is a relatively good approximation of the equation (2) if P in ranges from about 1 to 8 mW.

The carrier lifetime of the semiconductor laser amplifier 64 is reduced to about 0.1 ns or below by doping zinc in the active layer. Accordingly, the gain is saturated in accordance with the light signal modulated at 2.5 Gb/s. With $P_{in}=P_1$, a change in wavelength of the output $P_o$ of the semiconductor laser amplifier 64 is approximately proportional to $-dP_o/dt$ from the equations (1) and (3). As the input/output characteristic of the Er doped optical fiber amplifier 65 can be considered as linear, a change in wavelength of the output $P_X$ of the optical transmission apparatus is also approximately proportional to $-dP_X/dt$.

Given that $P_F$ is the power of the light in the optical fiber, a wavelength variation originated by the self phase modulation is proportional to $dP_F/dt$. Actually, the optical power changes due to the loss and wavelength dispersion as the light propagates in the optical fiber. Since the influence of the self phase modulation is large in the vicinity of the optical transmission apparatus where the optical power is large, however, the optical power can be considered as to be approximately proportional to $P_X$ in the wavelength region where the wavelength dispersion is relatively small.

If $P_X$ is controlled properly, the influence of the wavelength chirp, $\Delta\lambda \sim -dP_X/dt$, can almost be compensated by the wavelength shift by the self phase modulation, $\Delta\lambda \sim -dP_F/dt$, before the waveform changes greatly by the wavelength dispersion.

Figure 12:
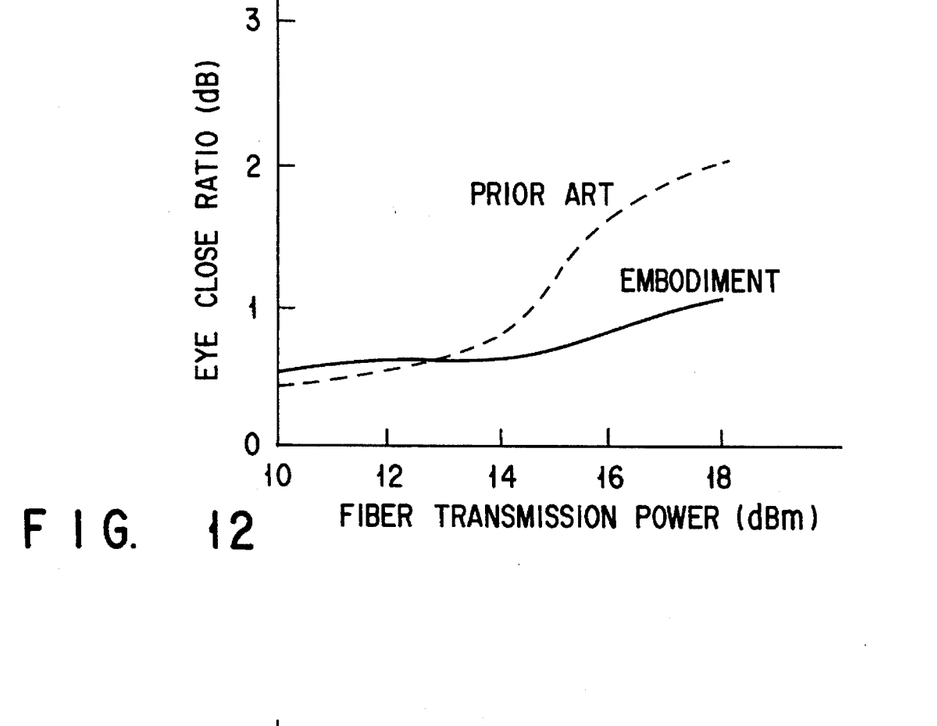
FIG. 12 is a diagram showing the relation between the fiber transmission power of the optical transmission apparatus in FIG. 10 and the eye close ratio in comparison with that of the prior art.

FIG. 12 shows the relation between the optical fiber transmission power of the optical transmission apparatus according to this embodiment and the eye opening penalty in comparison with that of the prior art. This relation is for the case where the normal dispersion fibers with the dispersion D of −2 ps/nm/km was used and a light signal modulated at 2.5 Gb/s was transmitted over 500 km.

The eye close ratio is defined by Pe (unit: dB)=−10 $\log_{10}(a/b)$ where "a" is the size of the eye opening acquired over a discrimination time (80 ps) that is 20% of the time slot, and "b" is the difference between the average levels "1" and "0" over this discrimination time. The small Pe is, the wider the eye is and the less the error rate is.

It is to be noted that the conventional optical transmission apparatus does not uses the semiconductor laser amplifier 64 of this embodiment but uses an alternative accomplished by a well-known technique. The bias current of the semiconductor laser 61 is set to the oscillation threshold value, and the laser output is modulated to a level higher than this bias level, with a 2.5-Gb/s NRZ signal with an amplitude of 50 mA. An intermediate repeater optical amplifier is inserted every 100 km to compensate for the transmission loss of the preceding stage.

It is apparent from FIG. 12 that the optical transmission apparatus of this embodiment can provide greater fiber transmission power than the prior art. This has resulted from the following advantage. As the effect of the cancellation of self phase modulation and the wave-length chirp becomes greater, even when the power is increased, the optical transmission will not easily be influenced by the self phase modulation.

It is therefore possible to make the repeater distance longer or improve the transmission quality as compared with the prior art, allowing the optical transmission apparatus of this embodiment to be use as part of an optical transmission apparatus which uses optical repeater amplifiers to accomplish long distance transmission without electric regeneration.

Figure 13:
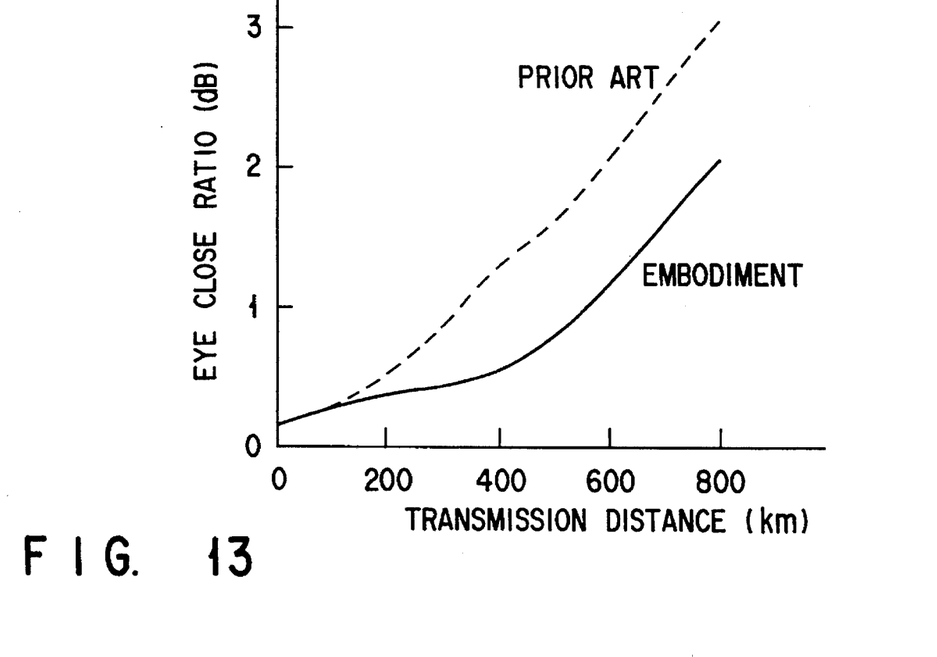
FIG. 13 is a diagram showing the relation between the transmission distance of the optical transmission apparatus in FIG. 10 and the eye close ratio in comparison with that of the prior art.

FIG. 13 presents graphs showing the eye opening penalty plotted as a function of distance with the fiber transmission power fixed to 16 dBm. The conditions other than the power and distance are the same as those of FIG. 12, and an repeater amplifier is inserted every 100 km to compensate for the transmission loss of the preceding stage as in the case of FIG. 12.

It is apparent from FIG. 13 that this embodiment has lower deterioration of the eye opening penalty even when the transmission distance becomes longer than the prior art. It is therefore possible to increase the repeatable distance without electric regeneration by simply increasing the number of repeater stages.

As described above, the optical transmission apparatus of this embodiment can ensure high speed long distance optical transmission which is not easily influenced by the wavelength chirp or self phase modulation even though the direct modulation of the semiconductor laser is employed.

When anomalous dispersion optical fibers are used instead of the normal dispersion optical fibers, unlike in the prior art case, long distance transmission can be accomplished as in the case of the normal dispersion by simply increasing the bias current slightly to thereby decrease the wavelength chirp.

In the above-described embodiment, the semiconductor laser 61 and the semiconductor laser amplifier 64 may be integrated on a single chip. Further, multistages of semiconductor laser amplifiers 64 may be connected. Furthermore, the characteristics of the semiconductor laser 61 and the semiconductor laser amplifier 64 are not limited to those of this embodiment.

An optical fiber having nearly zero dispersion may be connected only to the first part of the transmission optical fibers 66 so that after the influence of the wavelength chirp is compensated to a certain degree by its self phase modulation, the light signal is sent to a transmission optical fiber having larger dispersion. As described earlier with reference to FIG. 12, since this invention can increase the repeater distance per stage, a great effect can be expected in an optical transmission system which does not use intermediate repeater amplifiers. When intermediate repeater amplifiers are used, semiconductor laser amplifiers having a similar saturation characteristic may be provided in the optical repeater to compensate for the influence of the wavelength chirp in a distributed manner.

This invention can also be applied to a multi-stage optical repeater system which does not use the Er doped optical fiber amplifier 65 but uses only the semiconductor laser amplifier 64. In this case, it is preferable to set longer the carrier lifetime of the semiconductor laser amplifier which does not have a saturation characteristic. In the optical transmission system which does not use the Er doped optical fiber amplifiers 65, the same advantages can be obtained even with other wavelengths than 1.55 μm.

In this embodiment, in addition to an E/O conversion section for converting an electric signal to a light intensity signal by the direct modulation of a single mode semiconductor laser and an optical amplifying section for amplifying the output light from the E/O conversion section, an optical medium having a sublinear input/output characteristic may be used to deform the output light of the E/O conversion section. The optical medium having a sublinear input/output characteristic can be accomplished by a semiconductor laser amplifier whose effective carrier lifetime is shorter than the time corresponding to the inverse of the signal bit rate.

In this case, the output power $P_1$ of the semiconductor laser is approximately proportional to $-d(\log(P_1))/dt$ due to the wavelength shift (wavelength chirp) originated from the modulation. If the output of the optical medium, $P_2$, is set to $\log(P_1)+C$ as the sublinear characteristic of that optical medium, for example, the wavelength shift of the signal light after passing through this optical medium becomes approximately proportional to $-dP_2/dt$.

Since the wavelength chirp originated from the self phase modulation is proportional to $dP/dt$ where P is the optical power in the fiber, those two wavelength shifts have an equal function type with the opposite sign.

If the wavelength chirp is balanced with the self phase modulation, therefore, the influences of both can be canceled out each other, thus ensuring high speed long distance optical transmission, which is based on the direct modulation of the semiconductor laser and is not easily influenced by the wavelength chirp or self phase modulation.

The output of the optical medium need not be perfectly proportional to $\log(P_1)+C$, but the above-described advantages can be obtained though partially if the optical medium has a monotonous sublinear input/output characteristic. The gain-saturation characteristic of the optical medium should however follow up the high-speed modulated signal. For instance, with the use of an Er doped optical fiber amplifier, the lifetime of the excitation level is normally as long as µs to several tens of ms, the gain-saturation depends on the average output power and cannot follow up the high speed signal. The semiconductor laser amplifier normally has a carrier lifetime of the order of 1 ns and can follow up a change of the order of 1 Gbits per second. Further, if the carrier life is made intentionally shorter by doping in the active layer, the gain characteristic can follow up a signal with a speed of several Gbits per second.

As described in detail above, according to this invention, even if there is a change in the characteristic of the optical fibers, such as the wavelength dispersion characteristic, the received eye opening can always be kept wide by controlling the optical fiber transmission power to balance the wavelength chirp with the self phase modulation, thus achieving stable, high speed long distance optical fiber transmission.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical transmission apparatus for long-distance transmission, wherein the waveform of the light intensity signal is influenced by optical fiber wavelength dispersion and the Kerr effect, comprising:

optical transmitting means, including a single mode semiconductor laser and an optical fiber amplifier for amplifying an optical output from said semiconductor laser, for transmitting a light intensity signal containing a wavelength chirp, the light intensity signal being acquired by direct modulation of said single mode semiconductor laser, the power level of the light intensity signal transmitted by said optical transmitting means being initially set at a predetermined value;

optical receiving means for receiving the light intensity signal from said optical transmitting means;

at least one optical repeater means, including an optical amplifier for amplifying the light intensity signal supplied thereto and provided between said optical transmitting means and said optical receiving means, for relaying the light intensity signal without electrical regeneration, the power level of the light intensity signal relayed by said optical repeater means being initially set at a predetermined value;

optical fibers for transmitting the light intensity signal from said optical transmitting means to said optical receiving means via said optical repeater means; and control means, included in the optical receiving means, for detecting dispersions of said optical fibers and connected to control a gain of at least one of said optical amplifiers of said optical transmitting means and said optical repeater means using, as feedback information, a total dispersion of the detected dispersions of said optical fibers, so that, when the total dispersion is shifted to an anomalous dispersion side, the transmission power of at least one of said optical transmitting means and said optical repeater means is increased, and, when the total dispersion is shifted to a normal dispersion side, the transmission power of at least one of said optical transmitting means and said optical repeater means is reduced.

2. The optical transmission apparatus according to claim 1, wherein said control means comprises means for separately detecting dispersion characteristics of said optical transmitting means and said optical repeater means and independently controlling the dispersion characteristics in accordance with the detected dispersion characteristics.

3. An optical transmission apparatus comprising:

optical transmitting means, including a single mode semiconductor laser and at least one optical amplifier, for transmitting a light intensity signal with a wavelength chirp, the light intensity signal with wavelength chirp being acquired by direct modulation of said single mode semiconductor laser, a power level of the light intensity signal transmitted by said optical transmitting means being initially set high enough to induce self-phase modulation due to a Kerr effect in optical fibers;

optical receiving means for receiving the light intensity signal from said optical transmitting means;

at least one optical repeater means, including at least one optical amplifier and provided between said optical transmitting means and said optical receiving means, for relaying the light intensity signal without electrical regeneration, a power level of the light intensity signal relayed by said optical repeater means being initially set high enough to induce self-phase modulation due to the Kerr effect in optical fibers;

optical fibers for transmitting the light intensity signal from said optical transmitting means to said optical receiving means via said optical repeating means; and means included in said optical receiving means for detecting dispersions of said optical fibers and connected to control the individual power level of at least one of said light intensity signals transmitted into said individual optical fibers by controlling a gain of said optical amplifier in at least one of said optical transmitting means and said optical repeater means using, as feedback information, a total dispersion of the detected dispersions of said optical fibers, so that when a total dispersion of said optical fibers is shifted to the anomalous dispersion side, the power level is increased, and when the total dispersion of said optical fiber is shifted to the normal dispersion side, the power level is reduced.

4. An optical transmission apparatus comprising:

a plurality of optical fibers;

optical transmitting means including a plurality of single mode semiconductor lasers, a plurality of optical amplifiers and an optical multiplexer, for wavelength-multiplexing and transmitting a plurality of light intensity signals with wavelength chirp, each of the light intensity signals with wavelength chirp being acquired by direct modulation of said signal mode semiconductor lasers, power levels of the individual light intensity signals transmitted by said optical transmitting means being initially set at a total output power high enough to induce self-phase modulation due to a Kerr effect in said optical fibers;

optical receiving means for receiving the light intensity signals from said optical transmitting means;

at least one optical repeater means including at least one optical amplifier and provided between said optical transmitting means and said optical receiving means, for relaying the light intensity signals without electrical regeneration, power levels of the individual light intensity signals relayed by said optical repeater means being initially set at a total output power high enough to induce self-phase modulation due to the Kerr effect in said optical fibers; and means included in the optical receiving means for detecting dispersions of said optical fibers and obtaining a total dispersion of the detected dispersions;

wherein said optical fibers transmit the light intensity signals from said optical transmitting means to said optical receiving means via said optical repeater means, and the power levels of the light intensity signals transmitted by said optical transmitting means and relayed by said optical repeater means are set such that a power level of a wavelength channel is increased when the total dispersion is shifted to an anomalous dispersion side.

5. The optical transmission apparatus according to claim 4, wherein said optical transmitting means includes a plurality of external modulation type optical transmission modules for setting an external modulation of laser light to a wavelength on an anomalous dispersion side and a plurality of direct modulation system optical transmission modules for setting a direct modulation of laser light to a wavelength on a normal dispersion side.

* * * * *